Figure 1:
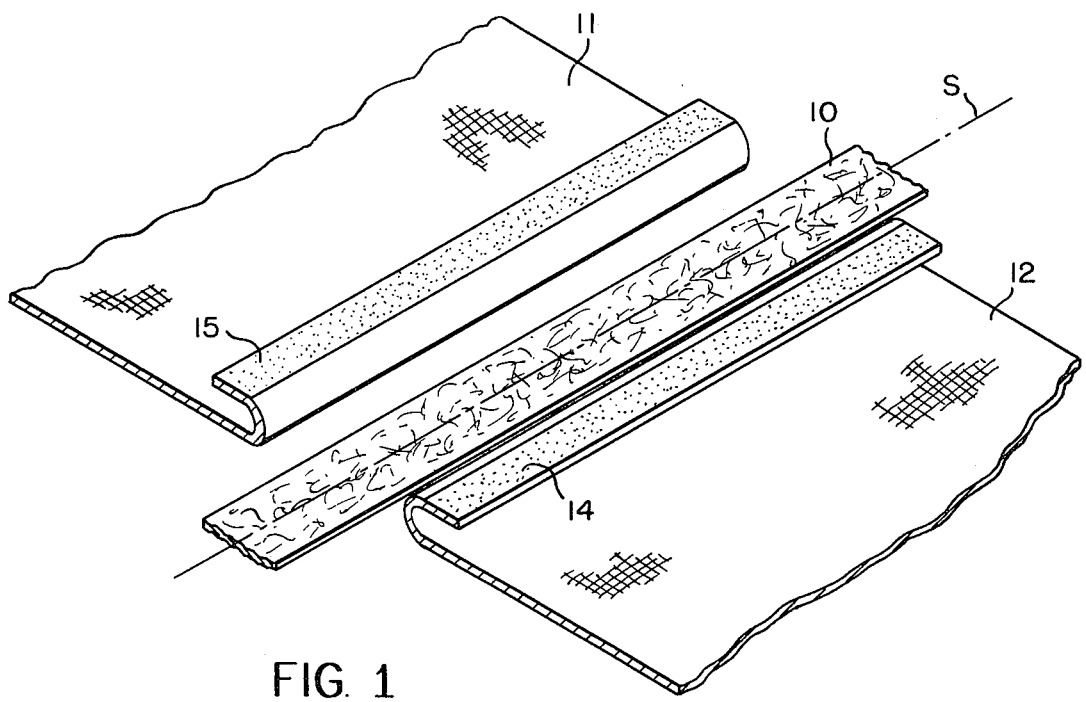

United States Patent [19]

Carder

[11] 3,969,564
[45] July 13, 1976

[54] METHOD OF SEAMING CARPETS AND TAPE USED THEREFOR

[75] Inventor: William E. Carder, Fairport, N.Y.

[73] Assignee: Carder Industries, Inc., Rochester, N.Y.

[22] Filed: Dec. 2, 1974

[21] Appl. No.: 528,634

[52] U.S. Cl. .............................. 428/212; 156/66; 156/157; 156/304; 156/305; 428/62; 428/346
[51] Int. Cl.² ..................... B32B 3/00; D04H 11/00
[58] Field of Search .................. 428/62, 88, 85, 95, 428/40, 343, 346, 212; 156/66, 157, 304, 305

[56] References Cited
UNITED STATES PATENTS

| | | | |
|---|---|---|---|
| 2,069,310 | 2/1937 | Higgins | 428/62 |
| 2,510,563 | 6/1950 | Dow | 428/62 |
| 2,524,456 | 10/1950 | Masland | 428/62 |
| 3,351,515 | 11/1967 | Muttera | 428/914 |

*Primary Examiner*—Marion E. McCamish
*Attorney, Agent, or Firm*—Shlesinger, Fitzsimmons & Shlesinger

[57] ABSTRACT

A flexible, permeable seaming tape is treated by saturating one side with a liquid adhesive, which is allowed to dry so that the adhesive becomes inactive or nontacky, thereby enabling the coated tape to be easily handled, coiled, etc. To seam together two carpet sections a strip of the tape is placed on a surface adhesive-side-up. The undersides of the sections adjacent the edges to be joined are coated with a liquid adhesive similar to that applied to the tape, and while still tacky, are urged downwardly against the tape with their edges in abutting relation. The still-damp adhesive on the carpet dissolves or reactivates the dry adhesive in the tape to form, when dried, a strong cohesive bond between the tape and carpet. The tape may comprise a single layer of non-woven material, or a non-woven material secured to a fiber matrix which resists lateral stretching.

6 Claims, 2 Drawing Figures

U.S. Patent   July 13, 1976   3,969,564

METHOD OF SEAMING CARPETS AND TAPE USED THEREFOR

This application relates to the installation of floor coverings, and more particularly to a novel method for seaming together the abutting edges of adjacent carpet sections, and the like.

There are several known methods of seaming or joining together the adjacent edges of rug sections during the installation of wall-to-wall carpeting and the like. Perhaps the oldest method is simply to sew together the edges of adjacent carpet sections to join them together along a seam. More recently, however, it has become customary to employ some form of adhesive for this purpose, usually in combination with a narrow strip of seaming tape which extends along the seam. There are, however, numerous disadvantages associated with the use of adhesives in accordance with these known methods.

One such method, for example, involves the use of a seaming tape having on one or both sides thereof a tacky, pressure-sensitive adhesive. Where the tape has adhesive on one side only, it is placed tacky-side-up on the surface that is to be covered; and the edges of the carpet sections that are to be seamed are then pressed in abutting relation firmly against the adhesive surface of the tape to form a seam which extends approximately along the center of the tape. This is a so-called "floating" seam, which permits adjustment or positioning of the carpet after the carpet sections have been joined.

If the tape has pressure-sensitive adhesive on both surfaces thereof, the adhesive on the underside of the tape will, of course, secure the tape against movement on the surface that is to be carpeted. This results in a "fixed" type of seam, which precludes adjustment of the carpet after seaming.

The disadvantage of this system is that the carpet sections do not satisfactorily adhere to the pressure-sensitive adhesive tape with any degree of permanency. The reason is that the pressure-sensitive adhesive on the tape does not penetrate the overlying edges of the carpets sections, but merely adheres to some of the fibers projecting from the sections. Consequently the edges of the carpet sections tend to pull away from the tape rather easily when the carpet is stretched.

Another method of seaming carpets is to employ a plain, flexible seaming tape, which is temporarily secured to the surface that is to be covered (for example by tacking opposite ends thereof to the surface) so that its longitudinal center line extends in the direction of the proposed seam. A liquid adhesive (for example a water soluble latex adhesive) is then applied or brushed onto the surface of the tape, after which the edges of the carpet sections that are to be joined are forced downwardly and in abutting relation against the face of the tape. Using this form of adhesive has the advantage that, provided the edges of the carpet are pressed against the coated surface of the tape before much of the solvent in the adhesive has had a chance to evaporate, the still moist adhesive will tend to penetrate somewhat into the undersides of the carpet sections to provide a bond which is usually somewhat stronger than that provided by the above-described pressure-sensitive adhesive tape. Nevertheless, the use of this plain tape has the disadvantage that it must be coated with an adhesive after it has been secured to the surface that is to be covered; and the carpet that is to be adhered to the tape must be quickly placed against the adhesive while it is still moist to enable the adhesive to penetrate into the bottom of the carpet.

Where plain seaming tape is employed, the liquid adhesive could, of course, be applied to the undersides of the carpet sections as well as to the face of the tape, but this doubles the amount of time and effort required to apply the adhesive, and also makes it difficult to press the carpet edges in place while all of the applied adhesive is still moist.

Still another method of seaming carpet sections involves the use of a tape having on its face a heat-sensitive adhesive, which is normally dry, but which melts and becomes tacky when heated. As in other methods, the tape usually is temporarily secured to the floor adhesive-side-up, after which the edges of the carpet sections to be joined are placed in abutting relation along the center of the tape. A heated seaming tool (see for example U.S. Pat. No. 3,482,436) is then pushed manually along the face of the tape to melt the adhesive so that the adjacent edges of the carpet can be urged downwardly behind the instrument and against the heated, now-tacky adhesive. After the instrument is passed over the face of the tape, the previously heated adhesive cools and firmly adheres the overlying edges of the carpet to the tape. The disadvantage of this process is that it not only requires the use of heat and a special tool in order to actuate the adhesive; but also, depending upon the type of fiber that is employed in the carpet, the fibers may be damaged by the heat emitted by the tool. Moreover, this heat-sensitive type of adhesive usually sets very rapidly, so that there is little or no opportunity for making slight adjustments in the longitudinal positions of the carpet edges relative to each other along the seam; and it also produces a relatively rigid seam which often stands out noticeably from the rest of the carpet.

It is an object of this invention, therefore, to provide an improved method which obviates most of the disadvantages of known methods of adhesively seaming together the edges of adjacent sections of wall-to-wall carpeting and the like, during the installation thereof. To this end it is an object also to provide a novel carpet seaming method which is easier to execute than most known methods, and yet produces a stronger and longer-lasting carpet seam.

Another object of this invention is to provide an improved method for seaming together carpet sections by utilizing a special seaming tape which is coated with an adhesive which becomes tacky only when treated with a predetermined liquid solvent.

A more specific object of this invention is to provide an improved method of seaming carpet sections by applying a liquid adhesive to the undersides of the carpet sections adjacent the edges that are to be seamed, and while still moist, urging the coated sections against the face of seaming tape which has been saturated with a dry adhesive similar to that applied to the carpet sections.

Still another object of this invention is to provide an improved carpet seaming tape, which enables the installation of wall-to-wall carpet sections rapidly and without objectionable mismatching along seams.

Other objects of the invention will be apparent hereinafter from the specification and from the recital of the appended claims, particularly when read in conjunction with the accompanying drawing.

Figure 2:
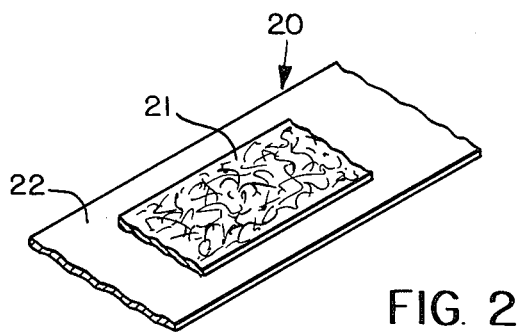

In the drawing:

FIG. 1 is a fragmentary perspective view of two sections of floor covering or carpeting in the process of being adhered to a seaming tape of the type made according to one embodiment of this invention; and FIG. 2 is a fragmentary perspective view of a modified form of seaming tape which may be used in practicing the novel process disclosed herein.

Referring now to the drawing by numerals of reference, and firs to FIG. 1, 10 denotes a strip of nonwoven, flexible seaming tape made, for example, from spun polyester fibers, and impregnated with an adhesive which may be of the type sold by Essex Chemical Co. of 1101 Hanzlik Avenue, Baltimore, MD., under the trademark "Webtex 505". In its liquid form this adhesive comprises a neoprene base and a methyl-ethyl-ketone solvent. It is applied in liquid form to one side of the tape 10 during the manufacture thereof, so that it penetrates and completely saturates the one side of the tape. After the solvent evaporates the adhesive remains in dry, inactive form in the tape so that it can be easily coiled, packaged and handled under such time that it is used in the seaming operation as described hereinafter.

During the installation of carpet sections, such as the sections denoted for example at 11 and 12 in the drawing, a strip of the tape 10 is placed adhesive-side-up on the floor wherever it is necessary to seam together the two edges of the sections. The tape is positioned so that its centerline will register with the line along which the carpet seam S (broken lines, FIG. 1) is to run; and opposite ends of the tape 10 may, if desired, be temporarily secured to the floor as by releasably securing them to the tackless strips which are usually fastened in known manner around the edges of the room that is to be carpeted.

After the tape 10 is in place, the carpet sections 11 and 12 are placed on the floor so that their edges abut to form the seam S, which registers as nearly as possible with the center of the tape 10. At this time the two confronting edge portions of the carpet sections may be stretched in the direction of the proposed seam, and are aligned relative to each other to prevent any mismatch of carpet patterns. The sections are then temporarily tacked along lines spaced inwardly from their edges to retain the alignment of the sections. These operations enable both the tape and the carpet sections to be located in their proper positions before the actual seaming step takes place.

After the tape 10 and carpet sections 11 and 12 are in place, the edges of sections 11 and 12 are rolled or bent backwardly about their temporary tack lines (one at a time if desired) as shown in FIG. 1. This exposes the undersides of the carpet sections in the areas 14 and 15 thereof, which are disposed to overlie the face of the tape along opposite sides of the seam S. The same liquid adhesive, which was applied to the tape 10 during its manufacture, is now applied, for example by a brush, to the undersides of sections 11 and 12 in the areas 14 and 15. Then, while the adhesive in these areas is still damp and tacky, the edges of sections 11 and 12 are urged downwardly in abutting relation against the face of the tape 10 so that the solvent in areas 14 and 15 penetrates into the face of the tape and dissolves the dry adhesive material therein. The adhesive in the tape 10 thus once again becomes moist or activated and flows into contact with the adhesive in carpet sections 11 and 12, so that when the adhesive thereafter dries, a very strong, cohesive bond results between the carpet sections and the tape.

Shortly after the seaming operation has taken place, for example with 5 to 10 minutes thereafter, the temporary tacks may be removed, and the seamed carpet sections may be stretched in known manner lengthwise and transversely of the carpet seam, and may be secured to the tackless strips around the periphery of the room to complete the installation.

From the foregoing, it will be apparent that the instant invention provides a relatively simple and reliable method for producing an extremely strong carpet seam. Adhesive is applied and penetrates into both the tape and the carpet adhered thereto, but because the adhesive is applied to the tape during the manufacture thereof, rather than during the installation of the carpet, the actual work involved in seaming carpet sections is considerably reduced, as compared to known methods of producing adhesive seams. Also, since only one side of the tape is saturated with adhesive, the tape does not adhere to a floor, but produces a floating seam which enables the position of the seamed carpet to be readily adjusted.

Moreover, since the adhesive in the tape is normally in a dry, inactive state, and can only be reactivated by contact with similar, moist adhesive, or with the liquid solvent therefor, the tape can be readily coiled or rolled and stored until needed. This contrasts with the pressure-sensitive type adhesive tape which adheres upon contact with almost any surface and is therefore difficult to handle whenever its adhesive surface is exposed, and which in many cases therefore requires the added expense of using a plastic film or cover over the adhesive, and which must be removed to expose the tacky, adhesive surface at the time of installation.

The process disclosed herein also has a further advantage that its setting or drying time can be reduced considerably as compared to the process in which plain seaming tape, or both the plain tape and carpet sections must be coated with a liquid adhesive at the time of installation. If the plain tape alone is coated, much of the solvent in the adhesive will, obviously, be adsorbed into the tape leaving very little to penetrate the carpet backing. On the other hand, if the quantity of available solvent is increased by coating both the tape and carpet backing, tge time and work involved is increased proportionately, and substantially more time is required to allow the confronting, saturated tape and carpet surfaces to dry. This prolongs undesirably the time the installers must wait before they can stretch the seamed carpet and secure its outer peripheral edges in place. By using the saturated, dry adhesive tape as taught by applicant, the setting or drying time for an adhesive seam can be reduced to a matter of 5 to 10 minutes, which enables the installation to be completed within minutes after a seam has been made.

In some instances it may be desirable to use a seaming tape which has substantially no lateral resilience. Such a tape is denoted generally by numeral 20 in FIG. 2. It comprises a flexible supporting tape or matrix 22, and a seaming tape 21, which is slightly narrower than tape 22. The tape 21 is similar to tape 10, except that during its manufacture both sides of the non-woven tape 21 are saturated with an adhesive of the type used on tape 10; and while one side of tape 21 is still tacky, it is adhered to the surface of the supporting tape 22. When the assembly is dry, the face of tape 21 will thus be impregnated with a dry adhesive, which can be reactivated to form a cohesive bond with carpeting, when employed in the manner described above in connection with tape 10.

The advantage of using the tape 20 is that the layer or portion 22 thereof prevents the non-woven tape 21 from stretching laterally when seamed carpet sections are stretched transversely of the associated seam. For this reason the supporting tape 22 is designed to be substantially stretch resistant in the direction of its width.

While the instant invention has been described in detail in connection with the installation of carpeting, it will be apparent that it would be equally advantageous to practice the method in connection with the installation of various forms of floor and wall coverings, wherever the use of a taped seam would not be objectionable. Moreover, it will be apparent that the specific adhesive disclosed herein is given merely by way of example, it being understood that other adhesives capable of functioning in the manner described herein may be employed, if desired.

Having described my invention, what I claim is:

1. A method of seaming sections of carpet together with flexible seaming tape, comprising:
   impregnating a permeable, flexible seaming tape with a liquid adhesive of the type which is tacky when moist, and non-tacky when dry,
   allowing the impregnated tape to dry after it has penetrated into the tape so that the adhesive therein becomes non-tacky,
   positioning a strip of the dry, impregnated tape on a surface that is to be covered by carpet,
   applying to the undersides of two sections of carpet, adjacent the edges thereof that are to form a seam, a liquid adhesive containing a solvent for the first-named adhesive, and
   while the adhesive on the undersides of said carpet sections is still moist, urging said undersides of the sections down onto said strip of tape, whereby the solvent in the moist adhesive on said carpet sections penetrates and remoistens the adhesive in said strip of tape, whereby the adhesive on said carpet sections and the remoistened adhesive in said strip of tape combine to form a cohesive bond between the carpet sections and said strip of tape, when the adhesive dries.

2. A method as defined in claim 1, wherein
   said tape is made from a fibrous material pereable by said first-named and the second-named adhesives, and
   said impregnating step comprises completely saturating said tape with said first-named adhesive.

3. A method as defined in claim 1, wherein the first and second-named adhesives are identical.

4. A method of utilizing both dry and liquid adhesives for adhesively seaming together two fabric sections, comprising:
   coating a flexible, permeable tape with a liquid adhesive in such manner that the liquid adhesive penetrates and at least partially saturates said tape,
   after the adhesive has penetrated and dried in the tape, placing a strip of the dry tape on a surface that is to be covered by fabric sections,
   coating the undersides of two sections of fabric, adjacent the edges thereof that are to be seamed together, with a liquid adhesive similar to the first-named adhesive, and
   urging the coated undersides of said fabric sections against said tape while the adhesive on said sections is still moist, whereby the adhesive in said tape is remoistened by the moist adhesive on said fabric sections and mixes therewith to form, upon drying, a cohesive bond between said tape and said sections.

5. A tape for use in adhesively seaming together two sections of carpet, comprising:
   a first strip of flexible, fibrous material,
   a second strip of flexible material secured to one side of said first strip, and
   a coating of dry adhesive material substantially permeating said first strip and operative, when contacted by a predetermined solvent, to dissolve and form a tacky, adhesive surface on said first strip,
   said second strip having a substantially greater resistance to stretching in a lateral direction than said first strip.

6. A tape as defined in claim 5, wherein said second strip is wider than said first strip and has side portions thereof projecting beyond the side edges of said first strip.

* * * * *